(12) United States Patent
Pawar et al.

(10) Patent No.: US 10,461,979 B2
(45) Date of Patent: Oct. 29, 2019

(54) SUBFRAME STRUCTURE FOR DISCRETE FOURIER TRANSFORM (DFT) SPREAD ORTHOGONAL FREQUENCY DIVISION MULTIPLEXING (S-OFDM) WAVEFORMS

(71) Applicant: INTEL IP CORPORATION, Santa Clara, CA (US)

(72) Inventors: Sameer Pawar, Santa Clara, CA (US); Huaning Niu, San Jose, CA (US); Hyejung Jung, Palatine, IL (US); Utsaw Kumar, Santa Clara, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 16/097,604

(22) PCT Filed: May 18, 2017

(86) PCT No.: PCT/US2017/033310
§ 371 (c)(1),
(2) Date: Oct. 29, 2018

(87) PCT Pub. No.: WO2017/201273
PCT Pub. Date: Nov. 23, 2017

(65) Prior Publication Data
US 2019/0158331 A1    May 23, 2019

Related U.S. Application Data

(60) Provisional application No. 62/338,914, filed on May 19, 2016.

(51) Int. Cl.
*H04J 99/00*    (2009.01)
*H04L 27/26*    (2006.01)
(Continued)

(52) U.S. Cl.
CPC ........ *H04L 27/2636* (2013.01); *H04L 5/0048* (2013.01); *H04L 5/0051* (2013.01);
(Continued)

(58) Field of Classification Search
USPC .................................................. 375/260, 267
See application file for complete search history.

(56) References Cited

U.S. PATENT DOCUMENTS

2018/0139014 A1*  5/2018  Xiong ........................ H04L 1/18
2018/0219709 A1*  8/2018  Pawar .................. H04L 27/2613
(Continued)

*Primary Examiner* — Eva Y Puente
(74) *Attorney, Agent, or Firm* — Thorpe North & Western

(57) ABSTRACT

Technology for a base station operable to encode guard interval (GI) discrete Fourier transform (DFT) spread orthogonal frequency-division multiplexing (OFDM) (GI-DFT-s-OFDM) data symbols for transmission to a user equipment (UE) is disclosed. The base station can identify GI-DFT-s-O 5 FDM data symbols for transmission to the UE. The base station can encode the GI-DFT-s-OFDM data symbols for transmission to the UE in a subframe. The subframe can be in accordance with a flexible subframe structure that begins with a demodulation reference signal (DMRS) sequence followed by a GI sequence in a first symbol of the subframe. The subframe can further comprise one or 10 more subsequent symbols in the subframe that each include a GI-DFT-s-OFDM data symbol followed by a GI sequence.

25 Claims, 12 Drawing Sheets

(51) Int. Cl.
*H04L 5/00* (2006.01)
*H04W 72/04* (2009.01)

(52) U.S. Cl.
CPC ...... *H04L 27/2605* (2013.01); *H04L 27/2611* (2013.01); *H04W 72/0446* (2013.01); *H04J 15/00* (2013.01)

(56) References Cited

U.S. PATENT DOCUMENTS

2019/0097859 A1* 3/2019 Bala .................... H04L 27/2613
2019/0158331 A1* 5/2019 Pawar .................. H04L 5/0051

* cited by examiner

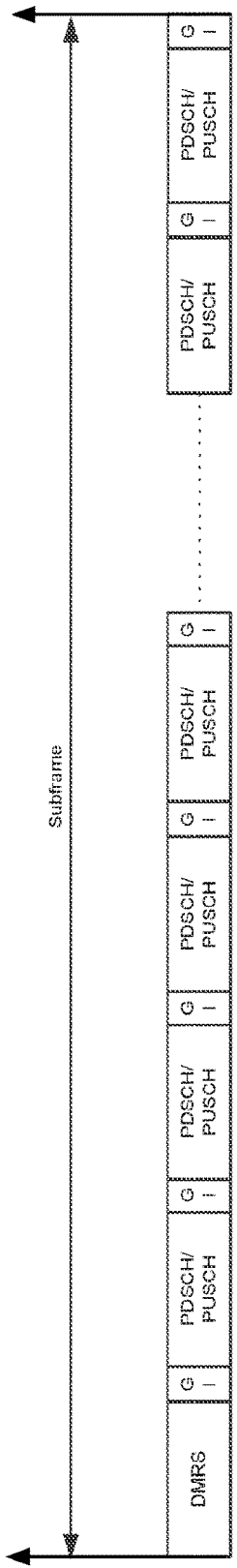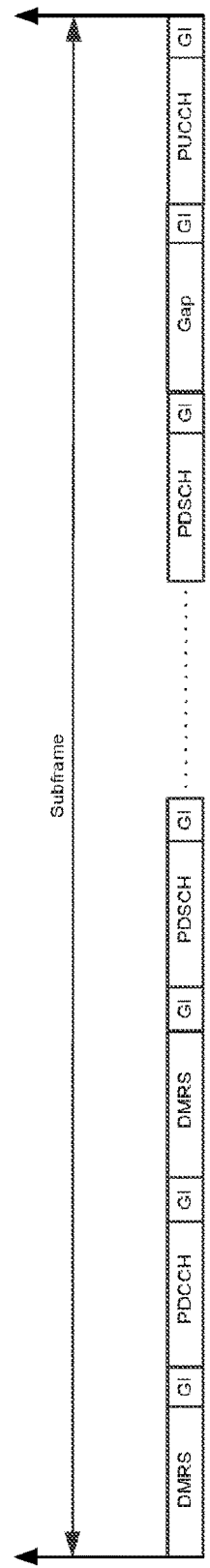
FIG. 5
FIG. 6

SUBFRAME STRUCTURE FOR DISCRETE FOURIER TRANSFORM (DFT) SPREAD ORTHOGONAL FREQUENCY DIVISION MULTIPLEXING (S-OFDM) WAVEFORMS

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in uplink (UL). Standards and protocols that use orthogonal frequency-division multiplexing (OFDM) for signal transmission include the third generation partnership project (3GPP) long term evolution (LTE) Release 8, 9, 10, 11, 12 and 13, the Institute of Electrical and Electronics Engineers (IEEE) 802.16 standard (e.g., 802.16e, 802.16), which is commonly known to industry groups as WiMAX (Worldwide interoperability for Microwave Access), and the IEEE 802.11 standard, which is commonly known to industry groups as WiFi.

In 3GPP radio access network (RAN) LTE systems (e.g., Release 13 and earlier), the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 5 illustrates a flexible subframe structure that includes symbols that are associated with a physical downlink control channel (PDCCH) or a physical uplink shared channel (PUSCH) in accordance with an example;

FIG. 6 illustrates a flexible subframe structure that includes a first region corresponding to a physical downlink control channel (PDCCH), a second region corresponding to a physical downlink shared channel (PDSCH) and a third region corresponding to a physical uplink control channel (PUCCH) in accordance with an example;

Figure 1:
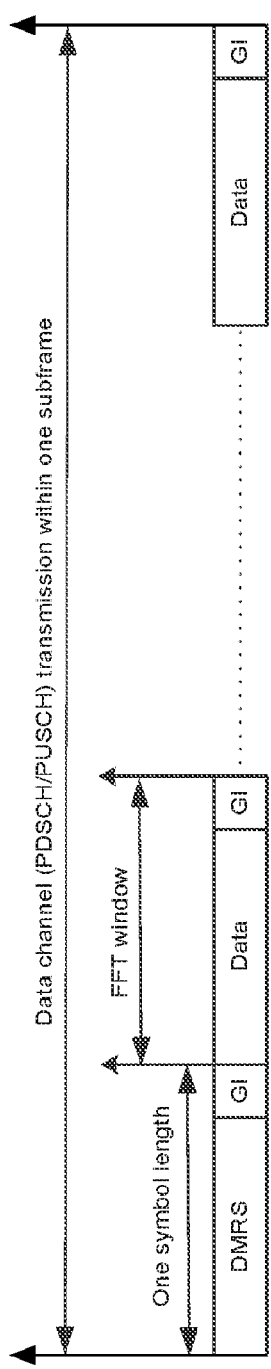
FIG. 1 illustrates a subframe that begins with a demodulation reference signal (DMRS) sequence followed by a guard interval (GI) sequence in a first symbol of the subframe in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In Fifth Generation (5G) wireless communication systems, several types of discrete Fourier transform (DFT) spread orthogonal frequency-division multiplexing (OFDM) (GI-DFT-s-OFDM) waveforms are being considered, such as guard interval (GI) DFT-s-OFDM waveforms and/or zero tail (ZT) DFT-s-OFDM waveforms. The GI DFT-s-OFDM waveforms can include a GI sequence, whereas the ZT DFT-s-OFDM waveforms can include a ZT sequence. For example, the GI sequence can be a fixed sequence at an end of a GI DFT-s-OFDM data symbol, whereas the ZT sequence can be a fixed sequence at an end of a ZT DFT-s-OFDM data symbol. The GI sequence or ZT sequence at the end of the ZT DFT-s-OFDM can provide an additional known sequence to allow efficient time/frequency tracking without an increase in tracking signal overhead, and the GI/ZT sequence can allow for flexible adjustment of a delay spread based on channel conditions without changing a hardware Fast Fourier Transform (FFT). In other words, since the GI/ZT sequence can be part of a FFT window, a length of the GI/ZT sequence can be flexibly adapted to effective channel delay spreads caused by different beamforming techniques, and without changing a symbol duration. In addition, compared to previous OFDM systems, the DFT-s-OFDM waveform can have a reduced peak-to-average power ratio (PAPR), which can result in a reduced number of analog-to-digital (ADC)/digital-to-analog (DAC) bits, improved power amplifier efficiency and increased range and coverage.

One challenge of DFT-s-OFDM is a necessity to include a GI sequence before and after every DFT-s-OFDM data symbol to achieve circular convolution. In other words, for data transmissions, data symbols are to start with one GI sequence and end with an additional GI sequence. When mapping data symbols to one subframe, this additional GI sequence can entail special handling. For example, in a previous solution, the additional GI sequence was accommodated through the usage of shortened data for a first symbol, but this solution resulted in a smaller FFT size for a last symbol at the receiver. The smaller FFT size for the last symbol was not ideal because this necessitated the transmitter and/or receiver to be able to handle two different FFT sizes.

In one example, to achieve circular convolution, a same sequence has to occur at a head of a data symbol and at the tail of the data symbol. This may not be a problem for in-between data symbols in a subframe since a tail of a previous data symbol can act as a head of a next data symbol. However, achieving circular convolution can be a problem at a last data symbol at the end of the subframe. In addition, achieving circular convolution can be a problem when data switches, e.g., a switch between a control channel and a data channel, or a switch between a first user channel and a second user channel. In addition, when a transmission beam forming is modified, the head and tail sequences of the data symbol can be different, thereby not achieving circular convolution.

In previous LTE systems, circular convolution was formed by having a cyclic prefix, which is a repetition of data included in a front of the symbol. For example, data from the front of the symbol can be copied to an end of the symbol, such that a front portion and a tail portion of the symbol are identical, thereby achieving circular convolution in previous LTE systems.

In the present technology, a novel symbol to subframe mapping structure is described for GI/ZT DFT-s-OFDM waveforms used in 5G high band data transmissions. A novel subframe can include data symbols that start with a GI sequence and end with an additional GI sequence. When mapping the data symbols to the subframe, this additional GI sequence can involve special handling. More specifically, a front loaded DMRS sequence can be used to provide the additional GI sequence and match a symbol boundary. The DMRS sequence can be included in a first symbol of the subframe for any particular block of data symbols. The DMRS sequence can be utilized for demodulation of the data symbols. As described in further detail below, the novel subframe can enable time division multiplexing of multiple UEs, and the inclusion of the DMRS sequence in the first symbol does not entail different FFT sizes.

FIG. 1 illustrates an exemplary mapping of symbols to a subframe. The subframe can be used for data transmissions over a channel, such as a physical downlink shared channel (PDSCH) and/or a physical uplink shared channel (PUSCH). The subframe can be used for uplink data transmissions over the PUSCH from a user equipment (UE) to a base station and/or the subframe can be used for downlink data transmissions over the PDSCH from the base station to the UE.

In one example, the subframe can begin with a demodulation reference signal (DMRS) sequence followed by a guard interval (GI) sequence (or alternatively a ZT sequence) in a first symbol of the subframe. The DMRS sequence and the GI sequence can correspond to a length of one symbol. Each symbol can be a size of an FFT window. The subsequent symbols in the subframe (i.e., the symbols after the DMRS sequence in the first symbol) can each include a data symbol and a GI/ZT sequence. The GI/ZT sequence can be a predetermined sequence at the end of the respective symbol. The data symbol can be a GI/ZT DFT-s-OFDM data symbol.

In one example, the first symbol in the subframe (which includes the DMRS sequence and the GI/ZT sequence) does not have effective circular convolution at a receiver since there is no GI/ZT sequence at a head of the first symbol. However, the DMRS sequence can be a known specific reference signal utilized for estimating the channel, and a channel estimation technique can be performed in the time/frequency domain, so circular convolution is not a necessity for the first symbol. The absence of the GI/ZT sequence at the head of the first symbol can be mitigated at the receiver using various advance signal processing techniques.

However, for the subsequent symbols in the subframe (i.e., the symbols after the DMRS sequence in the first symbol), the subframe can include a GI/ZT sequence at the head and the tail for each data symbol (e.g., GI/ZT DFT-s-OFDM data symbol), thereby achieving circular convolution and enabling the receiver to effectively process these symbols. For example, the GI/ZT sequence immediately following the DMRS sequence can be used with a next data symbol, and that next data symbol can be followed by another GI/ZT sequence, thereby achieving the circular convolution for the next data symbol in the subframe. In one example, the DMRS sequence and a following GI/ZT sequence can always be placed in the first symbol of the subframe, and then can be followed by the data symbols in the subframe. Therefore, the subframe can include a plurality of symbols, and the first symbol in the plurality of symbols can include the DMRS sequence and a GI/ZT sequence, and each of the subsequent symbols in the plurality of symbols can include a data symbol (e.g., GI/ZT DFT-s-OFDM data symbol) and a GI/ZT sequence.

Figure 2:
FIG. 2 illustrates a symbol that includes a first guard interval at a beginning of the symbol, a second guard interval at an end of the symbol and a demodulation reference signal (DMRS) sequence between the first guard interval and the second guard interval in accordance with an example.

FIG. 2 illustrates an exemplary symbol for inclusion in a subframe. The symbol can be a first symbol in the subframe. The symbol can include a first GI/ZT sequence at a beginning of the symbol and a second GI/ZT sequence at an end of the symbol. The symbol can include a demodulation reference signal (DMRS) sequence between the first GI/ZT sequence and the second GI/ZT sequence. In this example, due to the two GI/ZT sequence, the DMRS sequence can be shortened as compared to a symbol that includes a DMRS sequence and only one GI/ZT sequence. The first and second GI/ZT sequences may be shortened GI/ZT sequences. In addition, the symbol with the DMRS sequence and the two GI/ZT sequences can be followed by subsequent symbols (not shown), and each subsequent symbol can include a data symbol (e.g., GI/ZT DFT-s-OFDM data symbol) and a GI/ZT sequence. The inclusion of two GI/ZT sequences in the symbol (as opposed to a single GI/ZT sequence at the end of the symbol) can be useful for time tracking.

Figure 3:
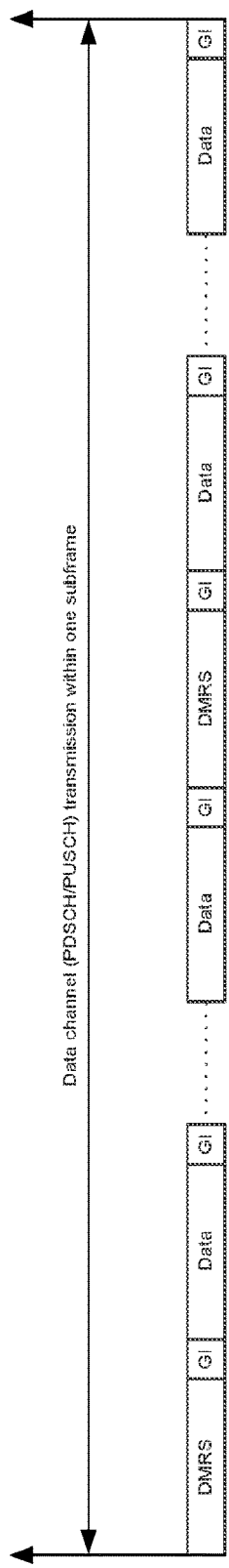
FIG. 3 illustrates a subframe for multiple user equipment that are time division multiplexed in the subframe in accordance with an example.

FIG. 3 illustrates an exemplary subframe for multiple UEs that are time division multiplexed in the subframe. The subframe can be used for data transmissions over a channel, such as a physical downlink shared channel (PDSCH) and/or a physical uplink shared channel (PUSCH). The subframe can be used for uplink data transmissions over the PUSCH from multiple UEs to a base station and/or the subframe can be used for downlink data transmissions over the PDSCH from the base station to the multiple UEs.

In one example, the same subframe can be used for multiple UEs. For example, the same subframe can be used for two different UEs, i.e., two UEs can be time division multiplexed within the same subframe. A first region of the subframe can be used for a first UE and a second region of the subframe can be used for a second UE. The first region of the subframe can start with a symbol with a first DMRS sequence followed by a GI/ZT sequence, and then the first region of the subframe can include subsequent symbols, where each subsequent symbol can include a data symbol (e.g., GI/ZT DFT-s-OFDM data symbol) and a GI/ZT sequence. Similarly, the second region of the subframe can start with a symbol with a second DMRS sequence followed by a GI/ZT sequence, and then the second region of the subframe can include subsequent symbols, where each subsequent symbol can include a data symbol (e.g., GI/ZT DFT-s-OFDM data symbol) and a GI/ZT sequence. Therefore, the first and second GI/ZT sequences following the first and second DMRS sequences, respectively, can be used by the subsequent data symbols to achieve circular convolution.

In one example, when switching between the first UE and the second UE, a beam forming can change for the second UE. A last GI/ZT sequence in the first region (corresponding to the first UE) of the subframe cannot be used for the second region (corresponding to the second UE) of the subframe because the GI/ZT sequence in the first region can be transmitted or received with a different beam as compared to the GI/ZT sequence in the second region. Therefore, as shown, when switching between the UEs, an additional DMRS sequence can be transmitted. In other words, due to narrow band beamforming, different beamforming weights can be applied when the base station switches transmission from the first UE to the second UE, so separate DMRS sequence transmissions are necessary for each UE. As a result, the two UEs can be scheduled within the same subframe in a time division multiplex (TDM) manner.

In one example, multiple UEs can be time division multiplexed within one subframe or within one transmission time interval (TTI). For example, different UEs can be time division multiplexed within one TTI in order to achieve a reduced latency or when medium sized packets are to be transmitted. The TTI can be 0.1 milliseconds (ms), but the TTI is not limited to only a length of 0.1 ms.

In one configuration, a flexible frame structure can be utilized for a 5G radio access technology (RAT). The flexible frame structure can enable each subframe to be built with basic building blocks, such as downlink control, downlink data, uplink control, uplink data, gap periods, downlink channel state information reference signals (CSI-RS), downlink beam refinement reference signals (BRRS), downlink primary synchronization signals (PSS) and downlink secondary synchronization signals (SSS), uplink sounding reference signals (SRS), uplink random access channel (RACH) signals, etc. In a 5G high band wireless communication system, the flexible frame structure can enable each of these building blocks to be time division multiplexed together to form the subframe.

Figure 4:
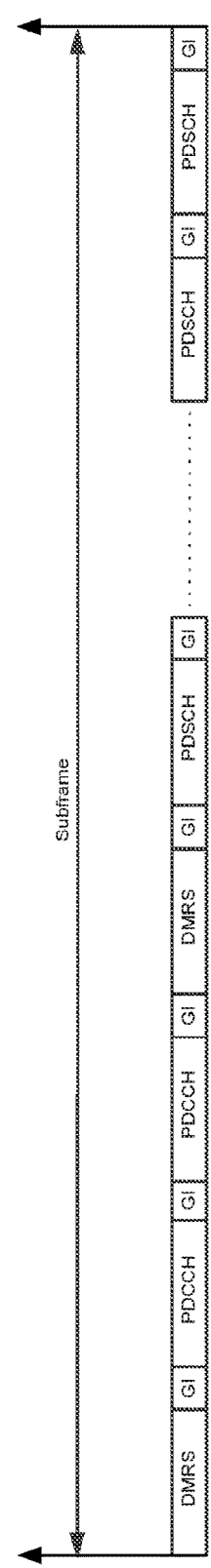
FIG. 4 illustrates a flexible subframe structure that includes a first region corresponding to a physical downlink control channel (PDCCH) and a second region corresponding to a physical downlink shared channel (PDSCH) in accordance with an example.

FIG. 4 illustrates an example of a flexible subframe structure for a subframe. The subframe can include a first region that is time division multiplexed with a second region. The first region can correspond to a physical downlink control channel (PDCCH) and the second region can correspond to a physical downlink shared channel (PDSCH). The first region can include a DMRS sequence in a first symbol of the first region. In other words, the first region can begin with the DMRS sequence, which can be followed by a GI/ZT sequence. Subsequent data symbols in the first region can each include a GI/ZT DFT-s-OFDM data symbol utilized for data transmission over the PDCCH, which is then followed by a GI/ZT sequence. Similarly, the second region can include a DMRS sequence in a first symbol of the second region. In other words, the second region can begin with the DMRS sequence (which is different than the DMRS sequence in the first region), which can be followed by a GI/ZT sequence. Subsequent data symbols in the second region can each include a GI/ZT DFT-s-OFDM data symbol utilized for data transmission over the PDSCH, which is then followed by a GI/ZT sequence. Therefore, each subsequent GI/ZT DFT-s-OFDM data symbol (in the first region and the second region) can be in between two GI/ZT sequences, which can achieve circular convolution.

In one example, when the data transmission is an uplink data transmission, a first symbol after the first region corresponding to the PDCCH can be a puncture for receive or transmit (Rx/Tx) switching, which can then be followed by a DMRS sequence and data symbols.

FIG. 5 illustrates an example of a flexible subframe structure for a subframe. The subframe can begin with a DMRS sequence, which can be followed by a GI/ZT sequence. The subframe can include a plurality of data symbols after the DMRS sequence and the GI/ZT sequence. The subsequent symbols can be GI/ZT DFT-s-OFDM data symbols utilized for data transmissions in the subframe. The GI/ZT DFT-s-OFDM data symbols can be associated with a physical downlink control channel (PDCCH) or a physical uplink shared channel (PUSCH). In addition, the subsequent data symbols can each include a GI/ZT sequence following a corresponding GI/ZT DFT-s-OFDM data symbol. Therefore, each GI/ZT DFT-s-OFDM data symbol can be in between two GI/ZT sequences, which can achieve circular convolution.

FIG. 6 illustrates an example of a flexible subframe structure for a subframe. The subframe can include multiple regions that are time division multiplexed within the subframe. For example, the subframe can include a first region that corresponds to a physical downlink control channel (PDCCH), a second region that corresponds to a physical downlink shared channel (PDSCH), and a third region that corresponds to a physical uplink control channel (PUCCH). The first and second regions can include DMRS sequences in first symbols of the first and second regions, respectively. In other words, the first region and the second region can each begin with a DMRS sequence, and then each are followed by a GI/ZT sequence. Subsequent data symbols in the first and second regions can include a GI/ZT DFT-s-OFDM data symbol utilized for data transmission over the PDCCH and PDSCH, respectively, which are then followed by a GI/ZT sequence. In addition, a gap period can separate the second region corresponding to the PDSCH from the third region corresponding to the PUCCH.

In one example, the third region corresponding to the PUCCH can only be one symbol when assuming a non-coherent sequence based PUCCH transmission. When coherent detection based PUCCH is adopted, multiple symbols can be utilized, and a first symbol in the third region corresponding to the PUCCH can include a DMRS sequence.

Figure 7:
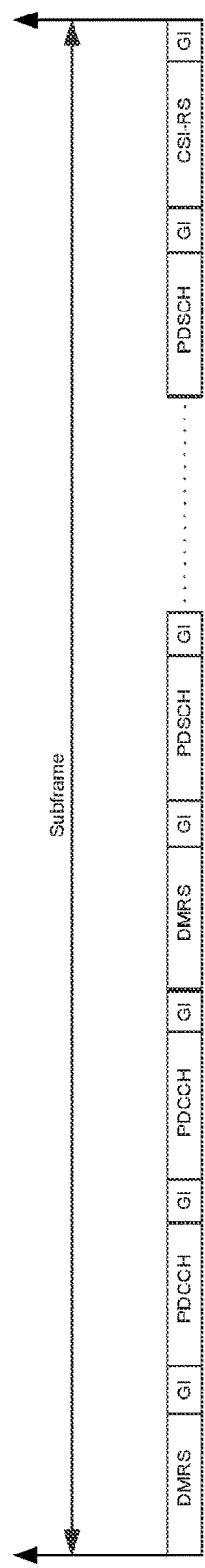
FIG. 7 illustrates a flexible subframe structure that includes a first region corresponding to a physical downlink control channel (PDCCH), a second region corresponding to a physical downlink shared channel (PDSCH) and a third region corresponding to a physical uplink control channel (PUCCH) that enables a transmission of channel state information reference signals (CSI-RS) in accordance with an example.

FIG. 7 illustrates an example of a flexible subframe structure for a subframe. The subframe can include multiple regions that are time division multiplexed within the subframe. For example, the subframe can include a first region that corresponds to a physical downlink control channel (PDCCH), a second region that corresponds to a physical downlink shared channel (PDSCH), a third region that corresponds to a physical uplink control channel (PUCCH). The first and second regions can each begin with a DMRS sequence. In one example, the third region can include one symbol that is utilized for a CSI-RS transmission for downlink multiple-input multiple-output (MIMO) training.

Figure 8A:
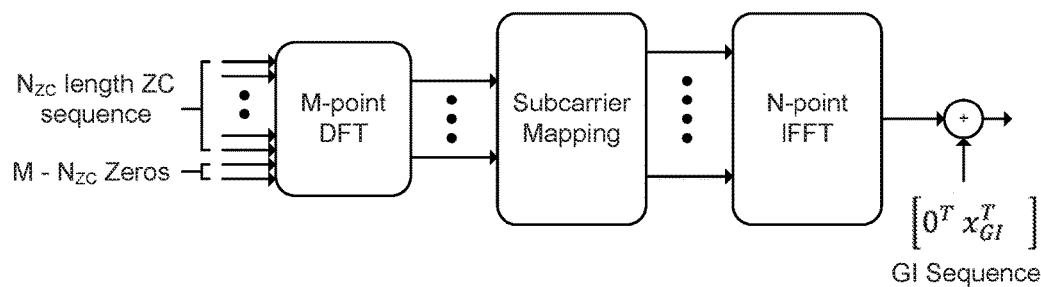
FIG. 8A illustrates a technique for generating data symbols in accordance with an example.

FIG. 8A illustrates an exemplary technique for generating data symbols, which can include DMRS symbols. The data symbols can be generated using an M-point discrete Fourier transform (DFT), subcarrier mapping and an N-point inverse Fast Fourier Transform (IFFT), which can all use linear processing. A $N_{ZC}$ length ZC sequence or M-$N_{ZC}$ zeros can be provided to the M-point DFT, and the N-point IFFT can provide a GI sequence. In one example, for a DFT spread waveform, a specific number of zeros can be added before a DFT spread, which can result in an output having a zero tail at the end. Then, a GI sequence can be appended at the tail, which causes a GI sequence occurring at the tail of every symbol. In another example, rather than appending zeros, an equivalent of the GI sequence to be added can be appended.

In one example, the GI sequence can be added before the M-point DFT. In this case, M-$N_{ZC}$ zeros can be replaced by a M-$N_{ZC}$ GI sequence directly before the M-point DFT. In another example, the data symbols (or DMRs) can be generated by appending zeros before the M-point DFT, and then replacing the zeros with a time domain GI sequence after the N-point IFFT In yet another example, the data symbols (or DMRs) can be generated by appending the GI sequence before the M-point DFT.

Figure 8B:
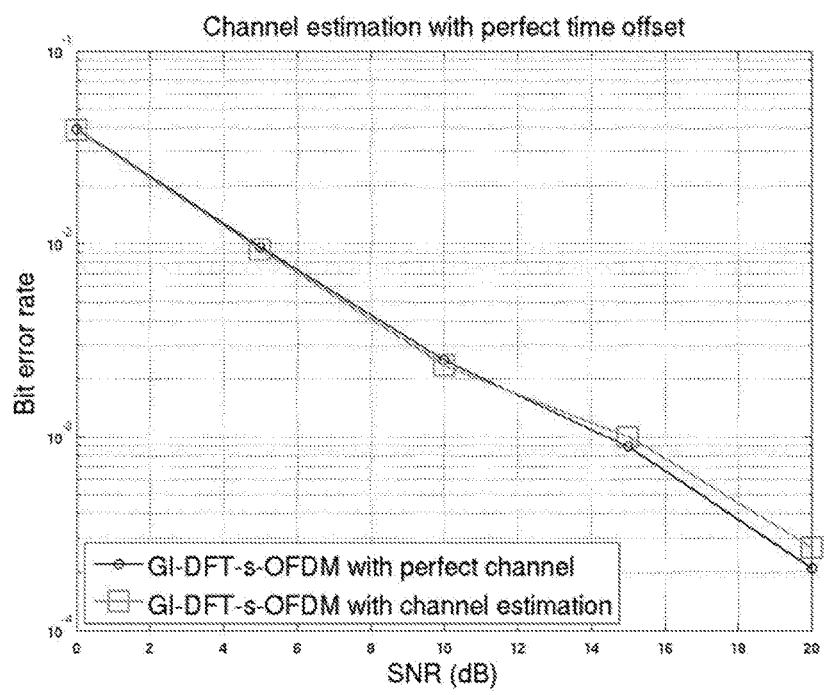
FIG. 8B illustrates a performance of a time domain channel estimation technique in accordance with an example.

FIG. 8B illustrates an exemplary performance of a time domain channel estimation technique. The time domain channel estimation technique can be preferred with the described GI/ZT DFT-s-OFDM symbol to subframe mapping technique described herein. To evaluate a performance of the time domain channel estimation technique, a minimum mean-square error (MMSE) channel estimation technique can be used while assuming perfect channel statistic information. In addition, the performance of the time domain channel estimation technique can be evaluated using the following parameters: an FFT size of 1024, a number of used subcarriers equal to 600, a simple 3-tap delay Gaussian channel with a delay spread equivalent to 2% of an OFDM symbol duration, a cyclic prefix or guard interval sequence size equal to 73 (which is 7% of the total OFDM samples), and a metric used is mean square error (MSE) (dB) equal to 20 log 10(norm(h-ĥ)). When evaluating the performance of the time domain channel estimation technique operated on the DMRS mapping with the GI/ZT DFT-s-OFDM waveform, there is a close overlap between a GI DFT-s-OFDM with a perfect channel and a GI DFT-s-OFDM with channel estimation (in terms of a bit error rate). In other words, when evaluating the impact of not having the GI sequence at the front of the DMRS sequence using signal processing techniques, there is a close overlap between the channel estimation and the perfect channel, thereby indicating that there is no significant loss when there is no GI sequence at the front of the first symbol in the subframe.

In one configuration, a time division duplex (TDD) wireless communication can be performed between a UE and a base station. In one example, the UE can generate a signal that includes a frame with multiple blocks (or subframes). Each subframe can include a DMRS sequence and a GI sequence, which is then followed by GI-DFT-s-OFDM.

In another example, the base station can generate a signal that includes a frame with multiple blocks (or subframes). Each subframe can include a DMRS sequence and a GI sequence, which is then followed by GI-DFT-s-OFDM.

In one example, the DMRS sequence can be placed in a first symbol of an uplink or downlink data transmission, and the DMRS sequence in the first symbol can be followed by a GI sequence. In another example, multiple UEs can be time division multiplexed together within one subframe, and each UE's data transmission can begin with a DMRS sequence, which is then followed by a GI sequence. In yet another example, different control and data regions can be time division multiplexed within a flexible subframe structure, where each region can begin with a DMRS sequence, which is then followed by a GI sequence. The different control and data regions can include a physical downlink control channel (PDCCH), a physical downlink shared channel (PDSCH), a physical uplink shared channel (PUSCH), etc.

In one example, a downlink and uplink switch gap period can consume a duration of one or more symbols. In another example, various types of reference symbols can consume one or more symbols when multiplexed into the flexible subframe structure. The types of reference symbols can include, but are not limited to, channel state information reference signals (CSI-RS), sounding reference signals (SRS), primary synchronization signals (PSS), random access channel (RACH) signals In one example, the DMRS sequence can be generated by appending zeros before a DFT, and then replacing the zeros with a time domain GI sequence after an inverse Fast Fourier Transform (IFFT). In another example, the DMRS sequence can be generated by appending the GI sequence before the DFT. In yet another example, the GI sequence can be inserted at two end of the DMRS sequence. In another example, time domain DMRS channel estimation can be performed.

Figure 9:
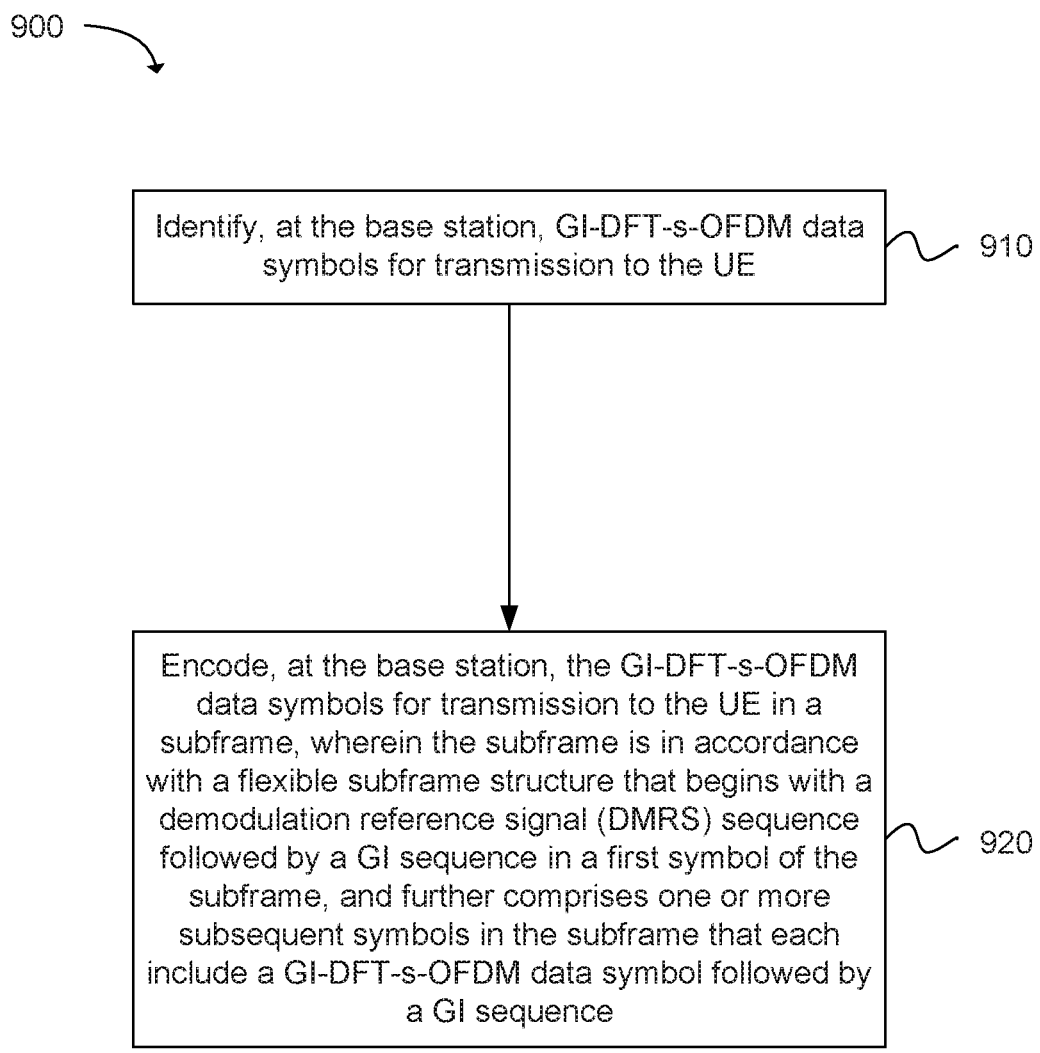
FIG. 9 depicts functionality of a base station operable to encode guard interval (GI) discrete Fourier transform (DFT) spread orthogonal frequency-division multiplexing (OFDM) (GI-DFT-s-OFDM) data symbols for transmission to a user equipment (UE) in accordance with an example.

Another example provides functionality 900 of a base station operable to encode guard interval (GI) discrete Fourier transform (DFT) spread orthogonal frequency-division multiplexing (OFDM) (GI-DFT-s-OFDM) data symbols for transmission to a user equipment (UE), as shown in FIG. 9. The base station can comprise one or more processors. The one or more processors can be configured to identify, at the base station, GI-DFT-s-OFDM data symbols for transmission to the UE, as in block 910. The one or more processors can be configured to encode, at the base station, the GI-DFT-s-OFDM data symbols for transmission to the UE in a subframe, wherein the subframe is in accordance with a flexible subframe structure that begins with a demodulation reference signal (DMRS) sequence followed by a GI sequence in a first symbol of the subframe, and further comprises one or more subsequent symbols in the subframe that each include a GI-DFT-s-OFDM data symbol followed by a GI sequence, as in block 920.

Figure 10:
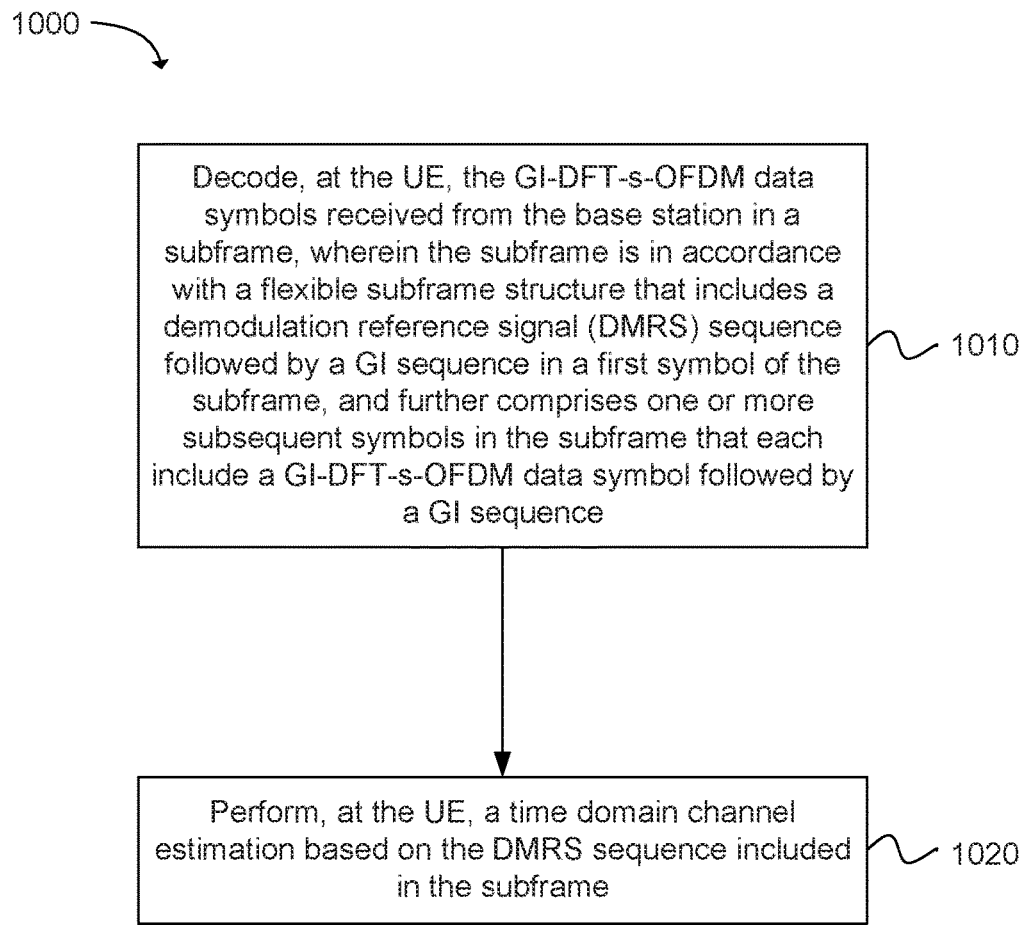
FIG. 10 depicts functionality of a user equipment (UE) operable to decode guard interval (GI) discrete Fourier transform (DFT) spread orthogonal frequency-division multiplexing (OFDM) (GI-DFT-s-OFDM) data symbols received from a base station in accordance with an example.

Another example provides functionality 1000 of a user equipment (UE) operable to decode guard interval (GI) discrete Fourier transform (DFT) spread orthogonal frequency-division multiplexing (OFDM) (GI-DFT-s-OFDM) data symbols received from a base station, as shown in FIG. 10. The UE can comprise one or more processors. The one or more processors can be configured to decode, at the UE, the GI-DFT-s-OFDM data symbols received from the base station in a subframe, wherein the subframe is in accordance with a flexible subframe structure that includes a demodulation reference signal (DMRS) sequence followed by a GI sequence in a first symbol of the subframe, and further comprises one or more subsequent symbols in the subframe that each include a GI-DFT-s-OFDM data symbol followed by a GI sequence, as in block 1010. The one or more processors can be configured to perform, at the UE, a time domain channel estimation based on the DMRS sequence included in the subframe, as in block 1020.

Figure 11:
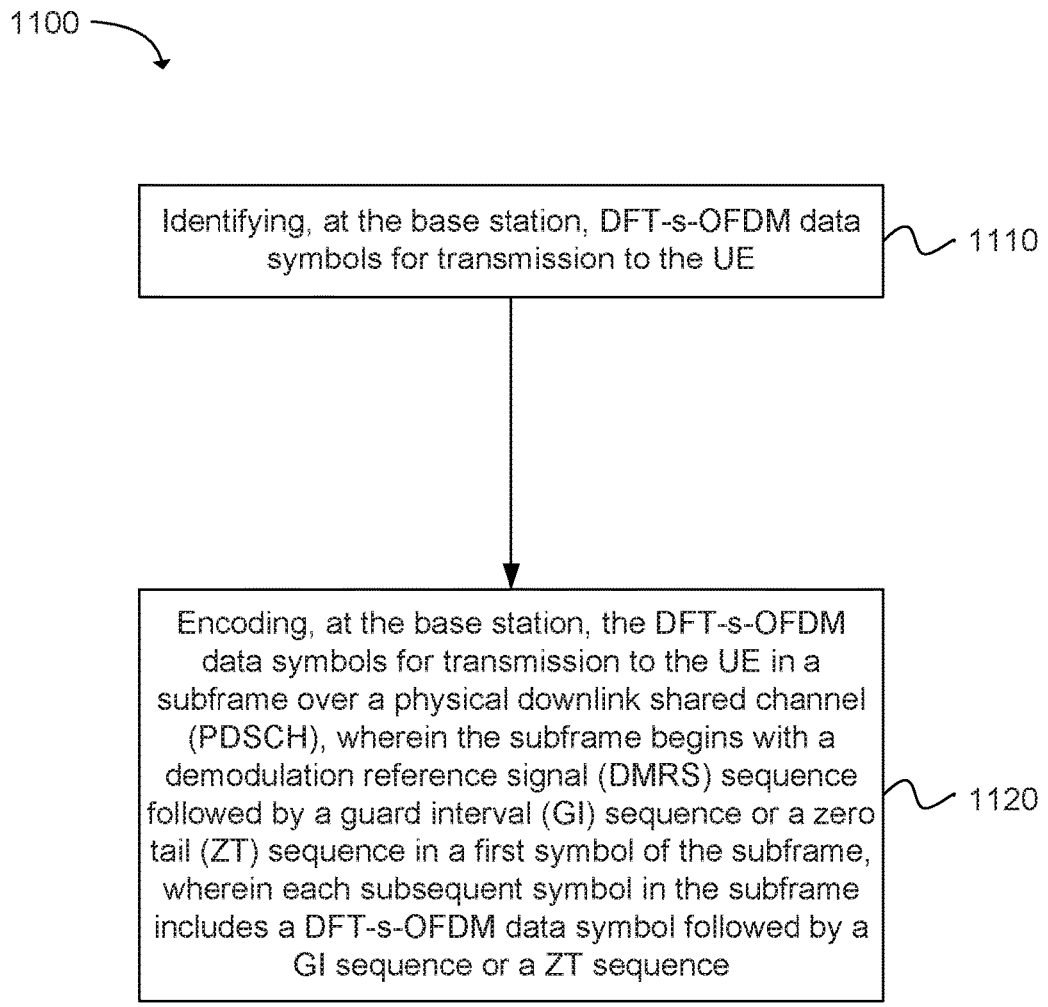
FIG. 11 depicts a flowchart of a machine readable storage medium having instructions embodied thereon for encoding discrete Fourier transform (DFT) spread orthogonal frequency-division multiplexing (OFDM) (DFT-s-OFDM) data symbols for transmission from a base station to a user equipment (UE) in accordance with an example.

Another example provides at least one machine readable storage medium having instructions 1100 embodied thereon for encoding discrete Fourier transform (DFT) spread orthogonal frequency-division multiplexing (OFDM) (DFT-s-OFDM) data symbols for transmission from a base station to a user equipment (UE), as shown in FIG. 11. The instructions can be executed on a machine, where the instructions are included on at least one computer readable medium or one non-transitory machine readable storage medium. The instructions when executed by one or more processors of the base station perform: identifying, at the base station, DFT-s-OFDM data symbols for transmission to the UE, as in block 1110. The instructions when executed by one or more processors of the base station perform: encoding, at the base station, the DFT-s-OFDM data symbols for transmission to the UE in a subframe over a physical downlink shared channel (PDSCH), wherein the subframe begins with a demodulation reference signal (DMRS) sequence followed by a guard interval (GI) sequence or a zero tail (ZT) sequence in a first symbol of the subframe, wherein each subsequent symbol in the subframe includes a DFT-s-OFDM data symbol followed by a GI sequence or a ZT sequence, as in block 1120.

Figure 12:
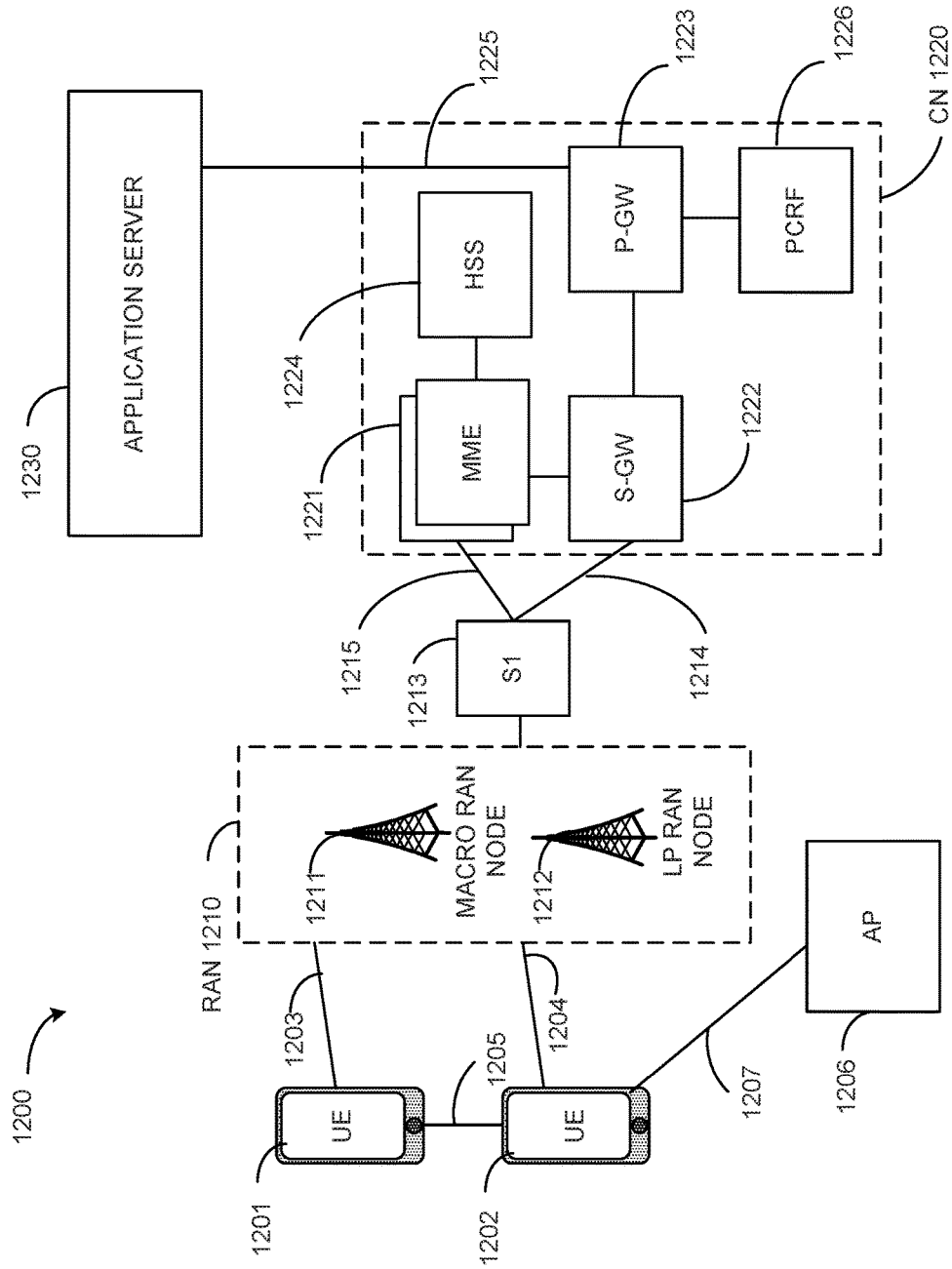
FIG. 12 illustrates an architecture of a wireless network in accordance with an example.

FIG. 12 illustrates an architecture of a system 1200 of a network in accordance with some embodiments. The system 1200 is shown to include a user equipment (UE) 1201 and a UE 1202. The UEs 1201 and 1202 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1201 and 1202 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1201 and 1202 may be configured to connect, e.g., communicatively couple, with a radio access network (RAN) 1210—the RAN 1210 may be, for example, an Evolved Universal Mobile Telecommunications System (UMTS) Terrestrial Radio Access Network (E-UTRAN), a NextGen RAN (NG RAN), or some other type of RAN. The UEs 1201 and 1202 utilize connections 1203 and 1204, respectively, each of which comprises a physical communications interface or layer (discussed in further detail below); in this example, the connections 1203 and 1204 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1201 and 1202 may further directly exchange communication data via a ProSe interface 1205. The ProSe interface 1205 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1202 is shown to be configured to access an access point (AP) 1206 via connection 1207. The connection 1207 can comprise a local wireless connection, such as a connection consistent with any IEEE 802.14 protocol, wherein the AP 1206 would comprise a wireless fidelity (WiFi®) router. In this example, the AP 1206 is shown to be connected to the Internet without connecting to the core network of the wireless system (described in further detail below).

The RAN 1210 can include one or more access nodes that enable the connections 1203 and 1204. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1210 may include one or more RAN nodes for providing macrocells, e.g., macro RAN node 1211, and one or more RAN nodes for providing femtocells or picocells (e.g., cells having smaller coverage areas, smaller user capacity, or higher bandwidth compared to macrocells), e.g., low power (LP) RAN node 1212.

Any of the RAN nodes 1211 and 1212 can terminate the air interface protocol and can be the first point of contact for the UEs 1201 and 1202. In some embodiments, any of the RAN nodes 1211 and 1212 can fulfill various logical functions for the RAN 1210 including, but not limited to, radio network controller (RNC) functions such as radio bearer management, uplink and downlink dynamic radio resource management and data packet scheduling, and mobility management.

In accordance with some embodiments, the UEs 1201 and 1202 can be configured to communicate using Orthogonal Frequency-Division Multiplexing (OFDM) communication signals with each other or with any of the RAN nodes 1211 and 1212 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1211 and 1212 to the UEs 1201 and 1202, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1201 and 1202. The physical downlink control channel (PDCCH) may carry information about the transport format and resource allocations related to the PDSCH channel, among other things. It may also inform the UEs 1201 and 1202 about the transport format, resource allocation, and H-ARQ (Hybrid Automatic Repeat Request) information related to the uplink shared channel. Typically, downlink scheduling (assigning control and shared channel resource blocks to the UE 1201 within a cell) may be performed at any of the RAN nodes 1211 and 1212 based on channel quality information fed back from any of the UEs 1201 and 1202. The downlink resource assignment information may be sent on the PDCCH used for (e.g., assigned to) each of the UEs 1201 and 1202.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1210 is shown to be communicatively coupled to a core network (CN) 1220—via an S1 interface 1213. In embodiments, the CN 1220 may be an evolved packet core (EPC) network, a NextGen Packet Core (NPC) network, or some other type of CN. In this embodiment the S1 interface 1213 is split into two parts: the S1-U interface 1214, which carries traffic data between the RAN nodes 1211 and 1212 and the serving gateway (S-GW) 1222, and the S1-mobility management entity (MME) interface 1215, which is a signaling interface between the RAN nodes 1211 and 1212 and MMEs 1221.

In this embodiment, the CN 1220 comprises the MMEs 1221, the S-GW 1222, the Packet Data Network (PDN) Gateway (P-GW) 1223, and a home subscriber server (HSS) 1224. The MMEs 1221 may be similar in function to the control plane of legacy Serving General Packet Radio Service (GPRS) Support Nodes (SGSN). The MMEs 1221 may manage mobility aspects in access such as gateway selection and tracking area list management. The HSS 1224 may comprise a database for network users, including subscription-related information to support the network entities' handling of communication sessions. The CN 1220 may comprise one or several HSSs 1224, depending on the number of mobile subscribers, on the capacity of the equipment, on the organization of the network, etc. For example, the HSS 1224 can provide support for routing/roaming, authentication, authorization, naming/addressing resolution, location dependencies, etc.

The S-GW 1222 may terminate the S1 interface 1213 towards the RAN 1210, and routes data packets between the RAN 1210 and the CN 1220. In addition, the S-GW 1222 may be a local mobility anchor point for inter-RAN node handovers and also may provide an anchor for inter-3GPP mobility. Other responsibilities may include lawful intercept, charging, and some policy enforcement.

The P-GW 1223 may terminate a SGi interface toward a PDN. The P-GW 1223 may route data packets between the EPC network 1223 and external networks such as a network including the application server 1230 (alternatively referred to as application function (AF)) via an Internet Protocol (IP) interface 1225. Generally, the application server 1230 may be an element offering applications that use IP bearer resources with the core network (e.g., UMTS Packet Services (PS) domain, LTE PS data services, etc.). In this embodiment, the P-GW 1223 is shown to be communicatively coupled to an application server 1230 via an IP communications interface 1225. The application server 1230 can also be configured to support one or more communication services (e.g., Voice-over-Internet Protocol (VoIP) sessions, PTT sessions, group communication sessions, social networking services, etc.) for the UEs 1201 and 1202 via the CN 1220.

The P-GW 1223 may further be a node for policy enforcement and charging data collection. Policy and Charging Enforcement Function (PCRF) 1226 is the policy and charging control element of the CN 1220. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1226 may be communicatively coupled to the application server 1230 via the P-GW 1223. The application server 1230 may signal the PCRF 1226 to indicate a new service flow and select the appropriate Quality of Service (QoS) and charging parameters. The PCRF 1226 may provision this rule into a Policy and Charging Enforcement Function (PCEF) (not shown) with the appropriate traffic flow template (TFT) and QoS class of identifier (QCI), which commences the QoS and charging as specified by the application server 1230.

Figure 13:
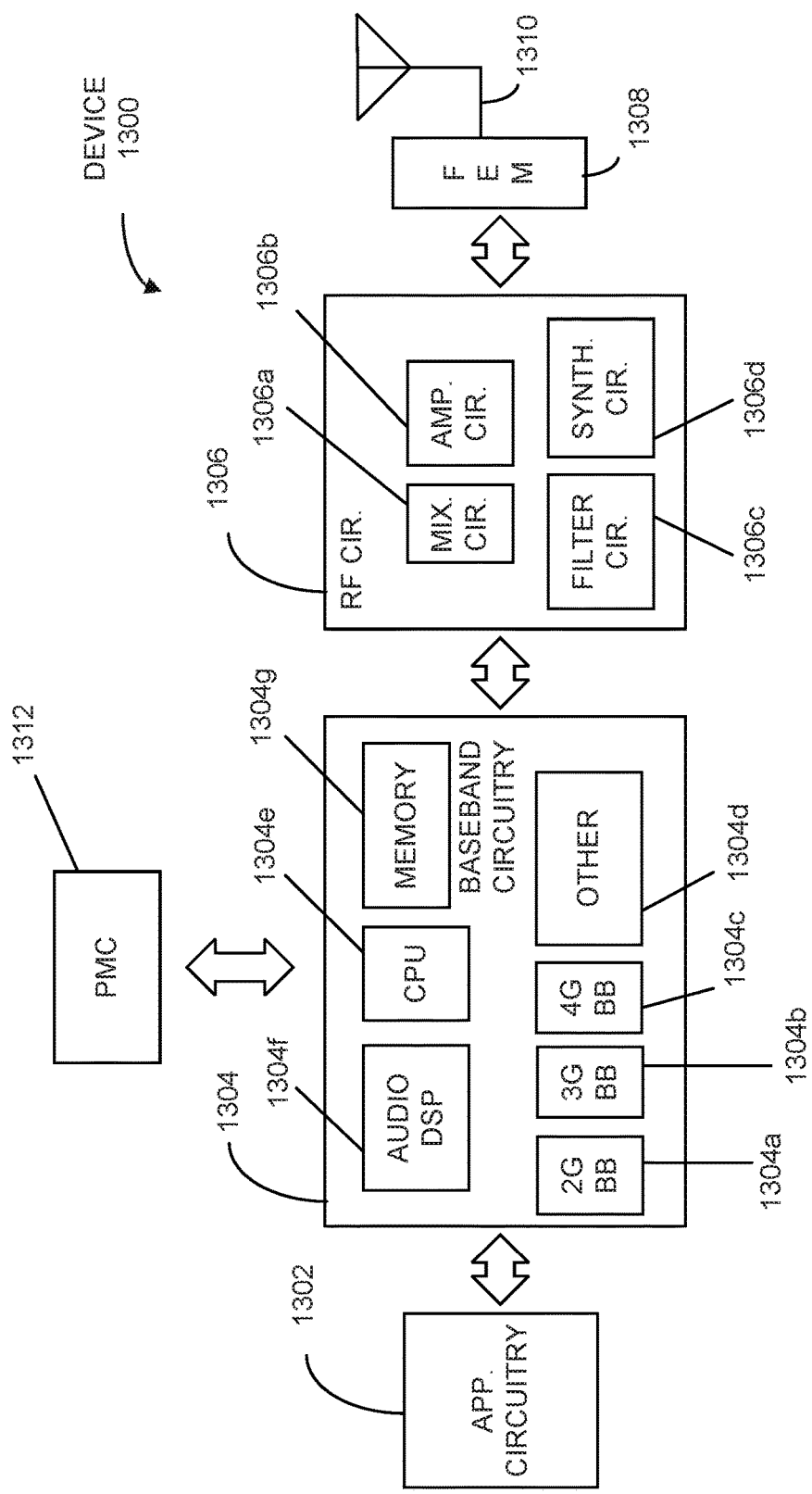
FIG. 13 illustrates a diagram of a wireless device (e.g., UE) in accordance with an example.

FIG. 13 illustrates example components of a device 1300 in accordance with some embodiments. In some embodiments, the device 1300 may include application circuitry 1302, baseband circuitry 1304, Radio Frequency (RF) circuitry 1306, front-end module (FEM) circuitry 1308, one or more antennas 1310, and power management circuitry (PMC) 1312 coupled together at least as shown. The components of the illustrated device 1300 may be included in a UE or a RAN node. In some embodiments, the device 1300 may include less elements (e.g., a RAN node may not utilize application circuitry 1302, and instead include a processor/controller to process IP data received from an EPC). In some embodiments, the device 1300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1302 may include one or more application processors. For example, the application circuitry 1302 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1300. In some embodiments, processors of application circuitry 1302 may process IP data packets received from an EPC.

The baseband circuitry 1304 may include circuitry such as, but not limited to, one or more single-core or multi-core processors. The baseband circuitry 1304 may include one or more baseband processors or control logic to process baseband signals received from a receive signal path of the RF circuitry 1306 and to generate baseband signals for a transmit signal path of the RF circuitry 1306. Baseband processing circuitry 1304 may interface with the application circuitry 1302 for generation and processing of the baseband signals and for controlling operations of the RF circuitry 1306. For example, in some embodiments, the baseband circuitry 1304 may include a third generation (3G) baseband processor 1304*a*, a fourth generation (4G) baseband processor 1304*b*, a fifth generation (5G) baseband processor 1304*c*, or other baseband processor(s) 1304*d* for other existing generations, generations in development or to be developed in the future (e.g., second generation (2G), sixth generation (6G), etc.). The baseband circuitry 1304 (e.g., one or more of baseband processors 1304*a-d*) may handle various radio control functions that enable communication with one or more radio networks via the RF circuitry 1306. In other embodiments, some or all of the functionality of baseband processors 1304*a-d* may be included in modules stored in the memory 1304*g* and executed via a Central Processing Unit (CPU) 1304*e*. The radio control functions may include, but are not limited to, signal modulation/demodulation, encoding/decoding, radio frequency shifting, etc. In some embodiments, modulation/demodulation circuitry of the baseband circuitry 1304 may include Fast-Fourier Transform (FFT), precoding, or constellation mapping/demapping functionality. In some embodiments, encoding/decoding circuitry of the baseband circuitry 1304 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1304 may include one or more audio digital signal processor(s) (DSP) 1304*f*. The audio DSP(s) 1304*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1304 and the application circuitry 1302 may be implemented together such as, for example, on a system on a chip (SOC).

In some embodiments, the baseband circuitry 1304 may provide for communication compatible with one or more radio technologies. For example, in some embodiments, the baseband circuitry 1304 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1304 is configured to support radio communications of more than one wireless protocol may be referred to as multi-mode baseband circuitry.

RF circuitry 1306 may enable communication with wireless networks using modulated electromagnetic radiation through a non-solid medium. In various embodiments, the RF circuitry 1306 may include switches, filters, amplifiers, etc. to facilitate the communication with the wireless network. RF circuitry 1306 may include a receive signal path which may include circuitry to down-convert RF signals received from the FEM circuitry 1308 and provide baseband signals to the baseband circuitry 1304. RF circuitry 1306 may also include a transmit signal path which may include circuitry to up-convert baseband signals provided by the baseband circuitry 1304 and provide RF output signals to the FEM circuitry 1308 for transmission.

In some embodiments, the receive signal path of the RF circuitry 1306 may include mixer circuitry 1306*a*, amplifier circuitry 1306*b* and filter circuitry 1306*c*. In some embodiments, the transmit signal path of the RF circuitry 1306 may include filter circuitry 1306*c* and mixer circuitry 1306*a*. RF circuitry 1306 may also include synthesizer circuitry 1306*d* for synthesizing a frequency for use by the mixer circuitry 1306*a* of the receive signal path and the transmit signal path. In some embodiments, the mixer circuitry 1306*a* of the receive signal path may be configured to down-convert RF signals received from the FEM circuitry 1308 based on the synthesized frequency provided by synthesizer circuitry 1306*d*. The amplifier circuitry 1306*b* may be configured to amplify the down-converted signals and the filter circuitry 1306*c* may be a low-pass filter (LPF) or band-pass filter (BPF) configured to remove unwanted signals from the down-converted signals to generate output baseband signals. Output baseband signals may be provided to the baseband circuitry 1304 for further processing. In some embodiments, the output baseband signals may be zero-frequency baseband signals, although this is not a requirement. In some embodiments, mixer circuitry 1306*a* of the receive signal path may comprise passive mixers, although the scope of the embodiments is not limited in this respect.

In some embodiments, the mixer circuitry 1306*a* of the transmit signal path may be configured to up-convert input baseband signals based on the synthesized frequency provided by the synthesizer circuitry 1306*d* to generate RF output signals for the FEM circuitry 1308. The baseband signals may be provided by the baseband circuitry 1304 and may be filtered by filter circuitry 1306*c*.

In some embodiments, the mixer circuitry 1306*a* of the receive signal path and the mixer circuitry 1306*a* of the transmit signal path may include two or more mixers and may be arranged for quadrature downconversion and upconversion, respectively. In some embodiments, the mixer circuitry 1306*a* of the receive signal path and the mixer circuitry 1306*a* of the transmit signal path may include two or more mixers and may be arranged for image rejection (e.g., Hartley image rejection). In some embodiments, the mixer circuitry 1306*a* of the receive signal path and the mixer circuitry 1306*a* may be arranged for direct downconversion and direct upconversion, respectively. In some embodiments, the mixer circuitry 1306*a* of the receive signal path and the mixer circuitry 1306*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1306 may include analog-to-digital converter (ADC) and digital-to-analog converter (DAC) circuitry and the baseband circuitry 1304 may include a digital baseband interface to communicate with the RF circuitry 1306.

In some dual-mode embodiments, a separate radio IC circuitry may be provided for processing signals for each spectrum, although the scope of the embodiments is not limited in this respect.

In some embodiments, the synthesizer circuitry 1306*d* may be a fractional-N synthesizer or a fractional N/N+1 synthesizer, although the scope of the embodiments is not limited in this respect as other types of frequency synthesizers may be suitable. For example, synthesizer circuitry 1306*d* may be a delta-sigma synthesizer, a frequency multiplier, or a synthesizer comprising a phase-locked loop with a frequency divider.

The synthesizer circuitry 1306*d* may be configured to synthesize an output frequency for use by the mixer circuitry 1306*a* of the RF circuitry 1306 based on a frequency input and a divider control input. In some embodiments, the synthesizer circuitry 1306*d* may be a fractional N/N+1 synthesizer.

In some embodiments, frequency input may be provided by a voltage controlled oscillator (VCO), although that is not a requirement. Divider control input may be provided by either the baseband circuitry 1304 or the applications processor 1302 depending on the desired output frequency. In some embodiments, a divider control input (e.g., N) may be determined from a look-up table based on a channel indicated by the applications processor 1302.

Synthesizer circuitry 1306*d* of the RF circuitry 1306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1306 may include an IQ/polar converter.

FEM circuitry 1308 may include a receive signal path which may include circuitry configured to operate on RF signals received from one or more antennas 1310, amplify the received signals and provide the amplified versions of the received signals to the RF circuitry 1306 for further processing. FEM circuitry 1308 may also include a transmit signal path which may include circuitry configured to amplify signals for transmission provided by the RF circuitry 1306 for transmission by one or more of the one or more antennas 1310. In various embodiments, the amplification through the transmit or receive signal paths may be done solely in the RF circuitry 1306, solely in the FEM 1308, or in both the RF circuitry 1306 and the FEM 1308.

In some embodiments, the FEM circuitry 1308 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1310).

In some embodiments, the PMC 1312 may manage power provided to the baseband circuitry 1304. In particular, the PMC 1312 may control power-source selection, voltage scaling, battery charging, or DC-to-DC conversion. The PMC 1312 may often be included when the device 1300 is capable of being powered by a battery, for example, when the device is included in a UE. The PMC 1312 may increase the power conversion efficiency while providing desirable implementation size and heat dissipation characteristics.

While FIG. 13 shows the PMC 1312 coupled only with the baseband circuitry 1304. However, in other embodiments, the PMC 1312 may be additionally or alternatively coupled with, and perform similar power management operations for, other components such as, but not limited to, application circuitry 1302, RF circuitry 1306, or FEM 1308.

In some embodiments, the PMC 1312 may control, or otherwise be part of, various power saving mechanisms of the device 1300. For example, if the device 1300 is in an RRC_Connected state, where it is still connected to the RAN node as it expects to receive traffic shortly, then it may enter a state known as Discontinuous Reception Mode (DRX) after a period of inactivity. During this state, the device 1300 may power down for brief intervals of time and thus save power.

If there is no data traffic activity for an extended period of time, then the device 1300 may transition off to an RRC_Idle state, where it disconnects from the network and does not perform operations such as channel quality feedback, handover, etc. The device 1300 goes into a very low power state and it performs paging where again it periodically wakes up to listen to the network and then powers down again. The device 1300 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1302 and processors of the baseband circuitry 1304 may be used to execute elements of one or more instances of a protocol stack. For example, processors of the baseband circuitry 1304, alone or in combination, may be used execute Layer 3, Layer 2, or Layer 1 functionality, while processors of the application circuitry 1304 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 14:
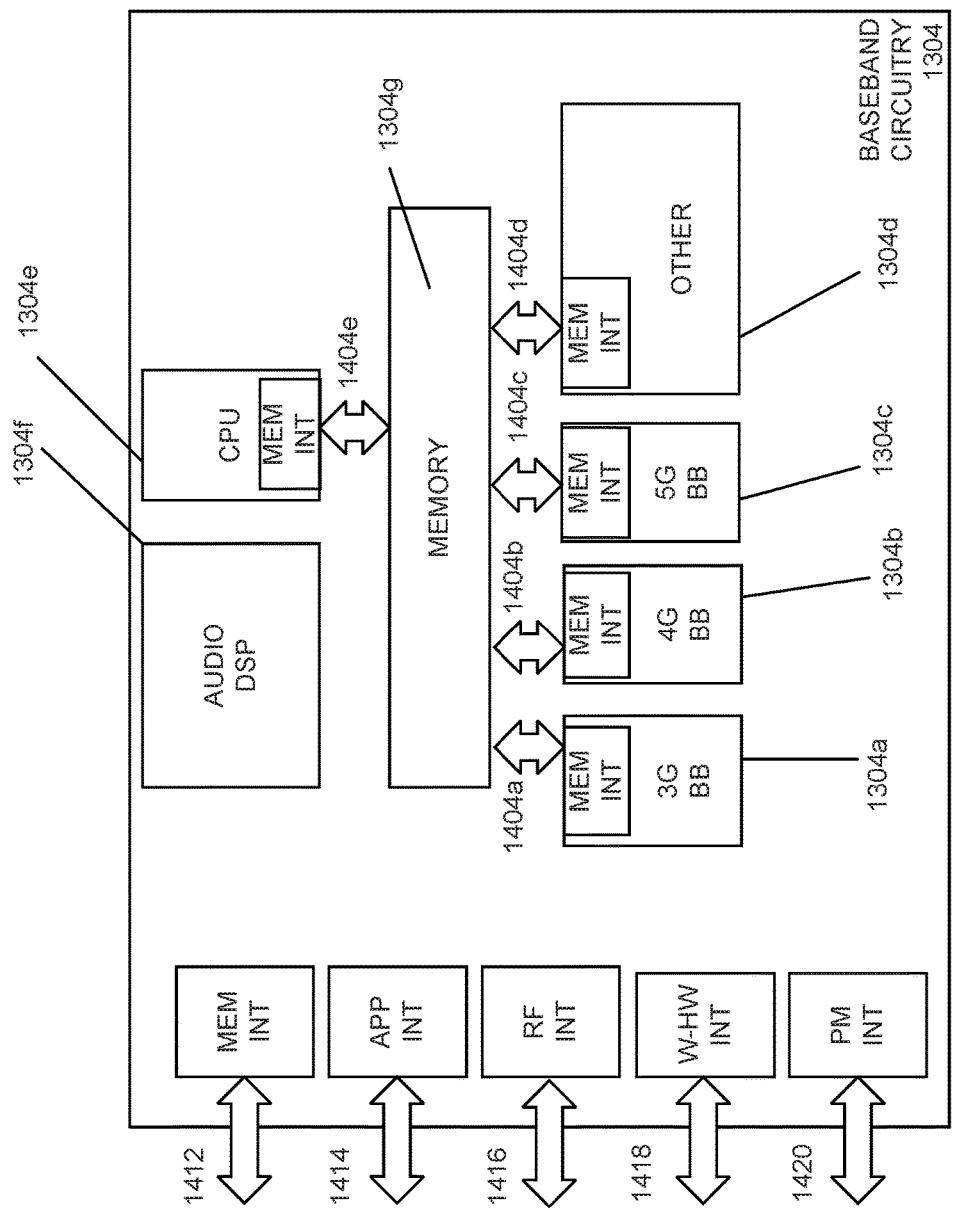
FIG. 14 illustrates interfaces of baseband circuitry in accordance with an example.
Figure 15:
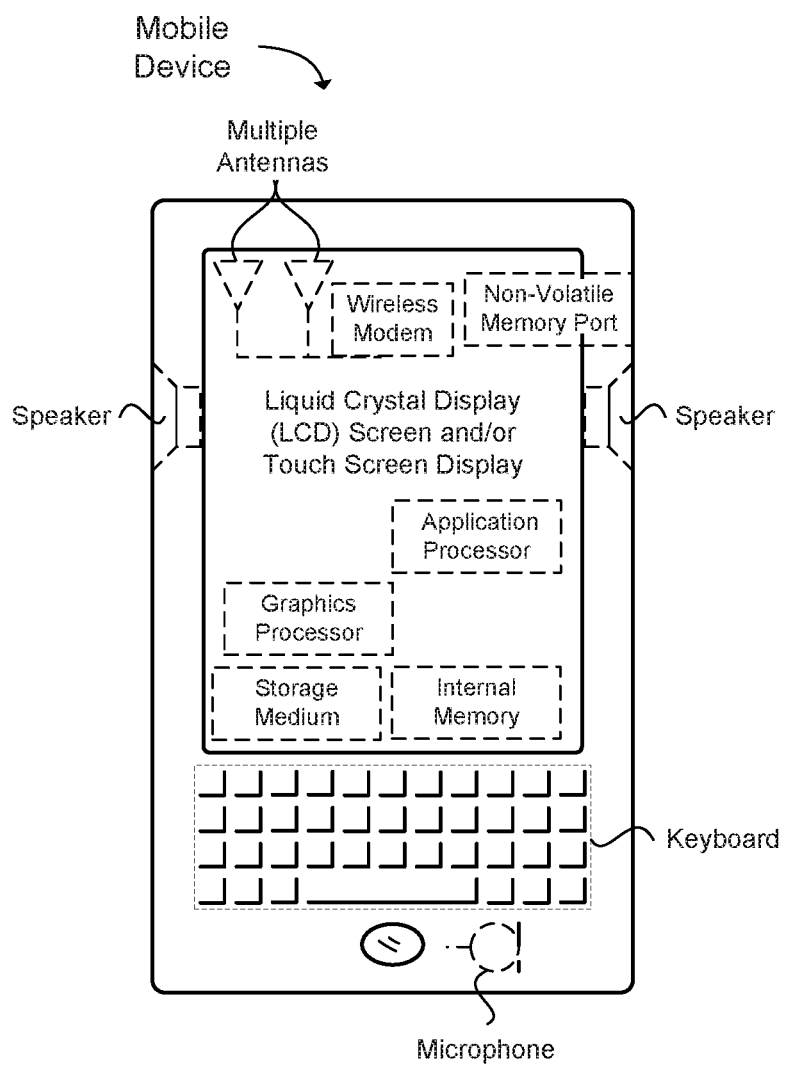
FIG. 15 illustrates a diagram of a wireless device (e.g., UE) in accordance with an example.

FIG. 14 illustrates example interfaces of baseband circuitry in accordance with some embodiments. As discussed above, the baseband circuitry 1304 of FIG. 13 may comprise processors 1304a-1304e and a memory 1304g utilized by said processors. Each of the processors 1304a-1304e may include a memory interface, 1404a-1404e, respectively, to send/receive data to/from the memory 1304g.

The baseband circuitry 1304 may further include one or more interfaces to communicatively couple to other circuitries/devices, such as a memory interface 1412 (e.g., an interface to send/receive data to/from memory external to the baseband circuitry 1304), an application circuitry interface 1414 (e.g., an interface to send/receive data to/from the application circuitry 1302 of FIG. 13), an RF circuitry interface 1416 (e.g., an interface to send/receive data to/from RF circuitry 1306 of FIG. 13), a wireless hardware connectivity interface 1418 (e.g., an interface to send/receive data to/from Near Field Communication (NFC) components, Bluetooth® components (e.g., Bluetooth® Low Energy), Wi-Fi® components, and other communication components), and a power management interface 1420 (e.g., an interface to send/receive power or control signals to/from the PMC 1312.

FIG. 13 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 13 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a base station operable to encode guard interval (GI) discrete Fourier transform (DFT) spread orthogonal frequency-division multiplexing (OFDM) (GI-DFT-s-OFDM) data symbols for transmission to a user equipment (UE), the base station comprising: one or more processors configured to: identify, at the base station, GI-DFT-s-OFDM data symbols for transmission to the UE; and encode, at the base station, the GI-DFT-s-OFDM data symbols for transmission to the UE in a subframe, wherein the subframe is in accordance with a flexible subframe structure that begins with a demodulation reference signal (DMRS) sequence followed by a GI sequence in a first symbol of the subframe, and further comprises one or more subsequent symbols in the subframe that each include a GI-DFT-s-OFDM data symbol followed by a GI sequence; and a memory interface configured to retrieve from a memory the GI-DFT-s-OFDM data symbols for transmission to the UE.

Example 2 includes the apparatus of Example 1, further comprising a transceiver configured to transmit the GI-DFT-s-OFDM data symbols to the UE in the subframe.

Example 3 includes the apparatus of any of Examples 1 to 2, wherein each GI-DFT-s-OFDM data symbol in the subframe has an associated GI sequence at a head of the GI-DFT-s-OFDM data symbol and an associated GI sequence at a tail of the GI-DFT-s-OFDM data symbol to achieve circular convolution.

Example 4 includes the apparatus of any of Examples 1 to 3, wherein a subsequent symbol in the one or more subsequent symbols in the subframe corresponds to a Fast Fourier Transform (FFT) window, wherein the FFT window of the subsequent symbol begins at an end of an associated GI sequence at a head of the GI-DFT-s-OFDM data symbol and the FFT window ends at an end of an associated GI sequence at a tail of the GI-DFT-s-OFDM data symbol.

Example 5 includes the apparatus of any of Examples 1 to 4, wherein the one or more processors are configured to: encode GI-DFT-s-OFDM data symbols for transmission to the UE over a physical downlink shared channel (PDSCH); or decode GI-DFT-s-OFDM data symbols received from the UE over a physical uplink shared channel (PUSCH).

Example 6 includes the apparatus of any of Examples 1 to 5, wherein the one or more processors are configured to encode the GI-DFT-s-OFDM data symbols for transmission to multiple UEs that are multiplexed in the subframe using time division multiplexing (TDM), wherein the subframe includes a separate DMRS sequence for each UE multiplexed in the subframe.

Example 7 includes the apparatus of any of Examples 1 to 6, wherein the flexible subframe structure includes a first region that is time division multiplexed with a second region, wherein the first region corresponds to a physical downlink control channel (PDCCH) and the second region corresponds to a physical downlink shared channel (PDSCH), wherein the first region includes a DMRS sequence in a first symbol of the first region, and the second region includes a DMRS sequence in a first symbol of the second region.

Example 8 includes the apparatus of any of Examples 1 to 7, wherein the flexible subframe structure includes the DMRS sequence and a plurality of GI-DFT-s-OFDM data symbols, wherein each GI-DFT-s-OFDM data symbol is associated with a physical downlink control channel (PDCCH) or a physical downlink shared channel (PDSCH).

Example 9 includes the apparatus of any of Examples 1 to 8, wherein the flexible subframe structure includes a first region that corresponds to a physical downlink control channel (PDCCH), a second region that corresponds to a physical downlink shared channel (PDSCH), a third region that corresponds to a physical uplink control channel (PUCCH) and a gap period between the second region and the third region, wherein the first region includes a DMRS sequence in a first symbol of the first region, and the second region includes a DMRS sequence in a first symbol of the second region.

Example 10 includes the apparatus of any of Examples 1 to 9, wherein the flexible subframe structure includes one or more symbols for at least one of: a channel state information reference signal (CSI-RS), a sounding reference signal (SRS), primary synchronization signal (PSS) or a random access channel (RACH) signal.

Example 11 includes the apparatus of any of Examples 1 to 10, wherein the base station operates in a Fifth Generation (5G) high band wireless communication system.

Example 12 includes the apparatus of any of Examples 1 to 11, wherein the base station is a next Generation NodeB (gNB).

Example 13 includes an apparatus of a user equipment (UE) operable to decode guard interval (GI) discrete Fourier transform (DFT) spread orthogonal frequency-division multiplexing (OFDM) (GI-DFT-s-OFDM) data symbols received from a base station, the UE comprising: one or more processors configured to: decode, at the UE, the GI-DFT-s-OFDM data symbols received from the base station in a subframe, wherein the subframe is in accordance with a flexible subframe structure that includes a demodulation reference signal (DMRS) sequence followed by a GI sequence in a first symbol of the subframe, and further comprises one or more subsequent symbols in the subframe that each include a GI-DFT-s-OFDM data symbol followed by a GI sequence; and perform, at the UE, a time domain channel estimation based on the DMRS sequence included in the subframe; and a memory interface configured to send to a memory the GI-DFT-s-OFDM data symbols received from the base station.

Example 14 includes the apparatus of Example 13, further comprising a transceiver configured to receive the GI-DFT-s-OFDM data symbols from the base station in the subframe.

Example 15 includes the apparatus of any of Examples 13 to 14, wherein each GI-DFT-s-OFDM data symbol in the subframe has an associated GI sequence at a head of the GI-DFT-s-OFDM data symbol and an associated GI sequence at a tail of the GI-DFT-s-OFDM data symbol to achieve circular convolution.

Example 16 includes the apparatus of any of Examples 13 to 15, wherein a subsequent symbol in the one or more subsequent symbols in the subframe corresponds to a Fast Fourier Transform (FFT) window, wherein the FFT window of the subsequent symbol begins at an end of an associated GI sequence at a head of the GI-DFT-s-OFDM data symbol and the FFT window ends at an end of an associated GI sequence at a tail of the GI-DFT-s-OFDM data symbol.

Example 17 includes the apparatus of any of Examples 13 to 16, wherein the first symbol of the subframe includes a first GI sequence at a head of the first symbol, a second GI sequence at a tail of the first symbol, and the DMRS sequence between the first GI sequence and the second GI sequence.

Example 18 includes the apparatus of any of Examples 13 to 17, wherein the one or more processors are configured to: decode GI-DFT-s-OFDM data symbols received from the base station over a physical downlink shared channel (PDSCH); or encode GI-DFT-s-OFDM data symbols for transmission to the base station over a physical uplink shared channel (PUSCH).

Example 19 includes the apparatus of any of Examples 13 to 18, wherein the flexible subframe structure includes GI-DFT-s-OFDM data symbols for multiple UEs that are multiplexed in the subframe using time division multiplexing (TDM), wherein the subframe includes a separate DMRS sequence for each UE multiplexed in the subframe.

Example 20 includes at least one machine readable storage medium having instructions embodied thereon for encoding discrete Fourier transform (DFT) spread orthogonal frequency-division multiplexing (OFDM) (DFT-s-OFDM) data symbols for transmission from a base station to a user equipment (UE), the instructions when executed by one or more processors of the base station perform the following: identifying, at the base station, DFT-s-OFDM data symbols for transmission to the UE; and encoding, at the base station, the DFT-s-OFDM data symbols for transmission to the UE in a subframe over a physical downlink shared channel (PDSCH), wherein the subframe begins with a demodulation reference signal (DMRS) sequence followed by a guard interval (GI) sequence or a zero tail (ZT) sequence in a first symbol of the subframe, wherein each subsequent symbol in the subframe includes a DFT-s-OFDM data symbol followed by a GI sequence or a ZT sequence.

Example 21 includes the at least one machine readable storage medium of Example 20, further comprising instructions when executed perform the following: encoding the DFT-s-OFDM data symbols for transmission to multiple UEs that are multiplexed in the subframe using time division multiplexing (TDM), wherein the subframe includes a separate DMRS sequence for each UE multiplexed in the subframe.

Example 22 includes the at least one machine readable storage medium of any of Examples 20 to 21, wherein the flexible subframe structure includes a first region that is time division multiplexed with a second region, wherein the first region corresponds to a physical downlink control channel (PDCCH) and the second region corresponds to a physical downlink shared channel (PDSCH), wherein the first region includes a DMRS sequence in a first symbol of the first region, and the second region includes a DMRS sequence in a first symbol of the second region.

Example 23 includes the at least one machine readable storage medium of any of Examples 20 to 22, wherein the flexible subframe structure includes the DMRS sequence and a plurality of DFT-s-OFDM data symbols, wherein each DFT-s-OFDM data symbol is associated with a physical downlink control channel (PDCCH) or a physical downlink shared channel (PDSCH).

Example 24 includes the at least one machine readable storage medium of any of Examples 20 to 23, wherein the flexible subframe structure includes a first region that corresponds to a physical downlink control channel (PDCCH), a second region that corresponds to a physical downlink shared channel (PDSCH), a third region that corresponds to a physical uplink control channel (PUCCH) and a gap period between the second region and the third region, wherein the first region includes a DMRS sequence in a first symbol of the first region, and the second region includes a DMRS sequence in a first symbol of the second region.

Example 25 includes the at least one machine readable storage medium of any of Examples 20 to 24, further comprising instructions when executed perform the following: generating a GI-DFT-s-OFDM data symbol by adding the GI sequence before a DFT spread or after a DFT spread.

Example 26 includes a base station operable to encode discrete Fourier transform (DFT) spread orthogonal frequency-division multiplexing (OFDM) (DFT-s-OFDM) data symbols for transmission to a user equipment (UE), the base station comprising: means for identifying, at the base station, DFT-s-OFDM data symbols for transmission to the UE; and means for encoding, at the base station, the DFT-s-OFDM data symbols for transmission to the UE in a subframe over a physical downlink shared channel (PDSCH), wherein the subframe begins with a demodulation reference signal (DMRS) sequence followed by a guard interval (GI) sequence or a zero tail (ZT) sequence in a first symbol of the subframe, wherein each subsequent symbol in the subframe includes a DFT-s-OFDM data symbol followed by a GI sequence or a ZT sequence.

Example 27 includes the base station of Example 26, further comprising: means for encoding the DFT-s-OFDM data symbols for transmission to multiple UEs that are multiplexed in the subframe using time division multiplexing (TDM), wherein the subframe includes a separate DMRS sequence for each UE multiplexed in the subframe.

Example 28 includes the base station of any of Examples 26 to 27, wherein the flexible subframe structure includes a first region that is time division multiplexed with a second region, wherein the first region corresponds to a physical downlink control channel (PDCCH) and the second region corresponds to a physical downlink shared channel (PDSCH), wherein the first region includes a DMRS sequence in a first symbol of the first region, and the second region includes a DMRS sequence in a first symbol of the second region.

Example 29 includes the base station of any of Examples 26 to 28, wherein the flexible subframe structure includes the DMRS sequence and a plurality of DFT-s-OFDM data symbols, wherein each DFT-s-OFDM data symbol is associated with a physical downlink control channel (PDCCH) or a physical downlink shared channel (PDSCH).

Example 30 includes the base station of any of Examples 26 to 29, wherein the flexible subframe structure includes a first region that corresponds to a physical downlink control channel (PDCCH), a second region that corresponds to a physical downlink shared channel (PDSCH), a third region that corresponds to a physical uplink control channel (PUCCH) and a gap period between the second region and the third region, wherein the first region includes a DMRS sequence in a first symbol of the first region, and the second region includes a DMRS sequence in a first symbol of the second region.

Example 31 includes the base station of any of Examples 26 to 30, further comprising instructions when executed perform the following: generating a GI-DFT-s-OFDM data symbol by adding the GI sequence before a DFT spread or after a DFT spread.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a base station operable to encode guard interval (GI) discrete Fourier transform (DFT) spread orthogonal frequency-division multiplexing (OFDM) (GI-DFT-s-OFDM) data symbols for transmission to a user equipment (UE), the base station comprising:
   one or more processors configured to:
      identify, at the base station, GI-DFT-s-OFDM data symbols for transmission to the UE; and
      encode, at the base station, the GI-DFT-s-OFDM data symbols for transmission to the UE in a subframe, wherein the subframe is in accordance with a flexible subframe structure that begins with a demodulation reference signal (DMRS) sequence followed by a GI sequence in a first symbol of the subframe, and further comprises one or more subsequent symbols in the subframe that each include a GI-DFT-s-OFDM data symbol followed by a GI sequence; and a memory interface configured to retrieve from a memory the GI-DFT-s-OFDM data symbols for transmission to the UE.

2. The apparatus of claim 1, further comprising a transceiver configured to transmit the GI-DFT-s-OFDM data symbols to the UE in the subframe.

3. The apparatus of claim 1, wherein each GI-DFT-s-OFDM data symbol in the subframe has an associated GI sequence at a head of the GI-DFT-s-OFDM data symbol and an associated GI sequence at a tail of the GI-DFT-s-OFDM data symbol to achieve circular convolution.

4. The apparatus of claim 1, wherein a subsequent symbol in the one or more subsequent symbols in the subframe corresponds to a Fast Fourier Transform (FFT) window, wherein the FFT window of the subsequent symbol begins at an end of an associated GI sequence at a head of the GI-DFT-s-OFDM data symbol and the FFT window ends at an end of an associated GI sequence at a tail of the GI-DFT-s-OFDM data symbol.

5. The apparatus of claim 1, wherein the one or more processors are configured to:
encode GI-DFT-s-OFDM data symbols for transmission to the UE over a physical downlink shared channel (PDSCH); or
decode GI-DFT-s-OFDM data symbols received from the UE over a physical uplink shared channel (PUSCH).

6. The apparatus of claim 1, wherein the one or more processors are configured to encode the GI-DFT-s-OFDM data symbols for transmission to multiple UEs that are multiplexed in the subframe using time division multiplexing (TDM), wherein the subframe includes a separate DMRS sequence for each UE multiplexed in the subframe.

7. The apparatus of claim 1, wherein the flexible subframe structure includes a first region that is time division multiplexed with a second region, wherein the first region corresponds to a physical downlink control channel (PDCCH) and the second region corresponds to a physical downlink shared channel (PDSCH), wherein the first region includes a DMRS sequence in a first symbol of the first region, and the second region includes a DMRS sequence in a first symbol of the second region.

8. The apparatus of claim 1, wherein the flexible subframe structure includes the DMRS sequence and a plurality of GI-DFT-s-OFDM data symbols, wherein each GI-DFT-s-OFDM data symbol is associated with a physical downlink control channel (PDCCH) or a physical downlink shared channel (PDSCH).

9. The apparatus of claim 1, wherein the flexible subframe structure includes a first region that corresponds to a physical downlink control channel (PDCCH), a second region that corresponds to a physical downlink shared channel (PDSCH), a third region that corresponds to a physical uplink control channel (PUCCH) and a gap period between the second region and the third region, wherein the first region includes a DMRS sequence in a first symbol of the first region, and the second region includes a DMRS sequence in a first symbol of the second region.

10. The apparatus of claim 1, wherein the flexible subframe structure includes one or more symbols for at least one of: a channel state information reference signal (CSI-RS), a sounding reference signal (SRS), primary synchronization signal (PSS) or a random access channel (RACH) signal.

11. The apparatus of claim 1, wherein the base station operates in a Fifth Generation (5G) high band wireless communication system.

12. The apparatus of claim 1, wherein the base station is a next Generation NodeB (gNB).

13. An apparatus of a user equipment (UE) operable to decode guard interval (GI) discrete Fourier transform (DFT) spread orthogonal frequency-division multiplexing (OFDM) (GI-DFT-s-OFDM) data symbols received from a base station, the UE comprising:
one or more processors configured to:
decode, at the UE, the GI-DFT-s-OFDM data symbols received from the base station in a subframe, wherein the subframe is in accordance with a flexible subframe structure that includes a demodulation reference signal (DMRS) sequence followed by a GI sequence in a first symbol of the subframe, and further comprises one or more subsequent symbols in the subframe that each include a GI-DFT-s-OFDM data symbol followed by a GI sequence; and
perform, at the UE, a time domain channel estimation based on the DMRS sequence included in the subframe; and
a memory interface configured to send to a memory the GI-DFT-s-OFDM data symbols received from the base station.

14. The apparatus of claim 13, further comprising a transceiver configured to receive the GI-DFT-s-OFDM data symbols from the base station in the subframe.

15. The apparatus of claim 13, wherein each GI-DFT-s-OFDM data symbol in the subframe has an associated GI sequence at a head of the GI-DFT-s-OFDM data symbol and an associated GI sequence at a tail of the GI-DFT-s-OFDM data symbol to achieve circular convolution.

16. The apparatus of claim 13, wherein a subsequent symbol in the one or more subsequent symbols in the subframe corresponds to a Fast Fourier Transform (FFT) window, wherein the FFT window of the subsequent symbol begins at an end of an associated GI sequence at a head of the GI-DFT-s-OFDM data symbol and the FFT window ends at an end of an associated GI sequence at a tail of the GI-DFT-s-OFDM data symbol.

17. The apparatus of claim 13, wherein the first symbol of the subframe includes a first GI sequence at a head of the first symbol, a second GI sequence at a tail of the first symbol, and the DMRS sequence between the first GI sequence and the second GI sequence.

18. The apparatus of claim 13, wherein the one or more processors are configured to:
decode GI-DFT-s-OFDM data symbols received from the base station over a physical downlink shared channel (PDSCH); or
encode GI-DFT-s-OFDM data symbols for transmission to the base station over a physical uplink shared channel (PUSCH).

19. The apparatus of claim 13, wherein the flexible subframe structure includes GI-DFT-s-OFDM data symbols for multiple UEs that are multiplexed in the subframe using time division multiplexing (TDM), wherein the subframe includes a separate DMRS sequence for each UE multiplexed in the subframe.

20. At least one non-transitory machine readable storage medium having instructions embodied thereon for encoding discrete Fourier transform (DFT) spread orthogonal frequency-division multiplexing (OFDM) (DFT-s-OFDM) data symbols for transmission from a base station to a user equipment (UE), the instructions when executed by one or more processors of the base station perform the following:
identifying, at the base station, DFT-s-OFDM data symbols for transmission to the UE; and
encoding, at the base station, the DFT-s-OFDM data symbols for transmission to the UE in a subframe over a physical downlink shared channel (PDSCH), wherein the subframe begins with a demodulation reference signal (DMRS) sequence followed by a guard interval (GI) sequence or a zero tail (ZT) sequence in a first symbol of the subframe, wherein each subsequent symbol in the subframe includes a DFT-s-OFDM data symbol followed by a GI sequence or a ZT sequence.

21. The at least one non-transitory machine readable storage medium of claim 20, further comprising instructions when executed perform the following: encoding the DFT-s-OFDM data symbols for transmission to multiple UEs that are multiplexed in the subframe using time division multiplexing (TDM), wherein the subframe includes a separate DMRS sequence for each UE multiplexed in the subframe.

22. The at least one non-transitory machine readable storage medium of claim 20, wherein the flexible subframe structure includes a first region that is time division multiplexed with a second region, wherein the first region corresponds to a physical downlink control channel (PDCCH) and the second region corresponds to a physical downlink shared channel (PDSCH), wherein the first region includes a DMRS sequence in a first symbol of the first region, and the second region includes a DMRS sequence in a first symbol of the second region.

23. The at least one non-transitory machine readable storage medium of claim 20, wherein the flexible subframe structure includes the DMRS sequence and a plurality of DFT-s-OFDM data symbols, wherein each DFT-s-OFDM data symbol is associated with a physical downlink control channel (PDCCH) or a physical downlink shared channel (PDSCH).

24. The at least one non-transitory machine readable storage medium of claim 20, wherein the flexible subframe structure includes a first region that corresponds to a physical downlink control channel (PDCCH), a second region that corresponds to a physical downlink shared channel (PDSCH), a third region that corresponds to a physical uplink control channel (PUCCH) and a gap period between the second region and the third region, wherein the first region includes a DMRS sequence in a first symbol of the first region, and the second region includes a DMRS sequence in a first symbol of the second region.

25. The at least one non-transitory machine readable storage medium of claim 20, further comprising instructions when executed perform the following: generating a GI-DFT-s-OFDM data symbol by adding the GI sequence before a DFT spread or after a DFT spread.

* * * * *